US012626836B2

(12) United States Patent
Boiron et al.

(10) Patent No.: US 12,626,836 B2
(45) Date of Patent: May 12, 2026

(54) ELECTRICAL INSULATION PAPER

(71) Applicant: AHLSTROM OYJ, Espoo (FI)

(72) Inventors: Lucie Boiron, Saint Egreve (FR); Thierry Mayade, Village du Lac de Paladru (FR)

(73) Assignee: AHLSTROM OYJ, Espoo (FI)

(*) Notice: Subject to any disclaimer, the term of this patent is extended or adjusted under 35 U.S.C. 154(b) by 0 days.

(21) Appl. No.: 19/103,303

(22) PCT Filed: Aug. 18, 2023

(86) PCT No.: PCT/IB2023/058290
§ 371 (c)(1),
(2) Date: Feb. 12, 2025

(87) PCT Pub. No.: WO2024/038415
PCT Pub. Date: Feb. 22, 2024

(65) Prior Publication Data
US 2025/0259764 A1 Aug. 14, 2025

(30) Foreign Application Priority Data
Aug. 19, 2022 (EP) .................................... 22306242

(51) Int. Cl.
*H01B 3/52* (2006.01)
*D21H 13/26* (2006.01)
(Continued)

(52) U.S. Cl.
CPC ............... *H01B 3/52* (2013.01); *D21H 13/26* (2013.01); *D21H 13/40* (2013.01); *D21H 17/07* (2013.01); *D21H 27/00* (2013.01); *H01B 19/02* (2013.01)

(58) Field of Classification Search
CPC .......... H01B 3/52; H01B 19/02; D21H 27/00; D21H 17/07; D21H 13/40; D21H 13/26
See application file for complete search history.

(56) References Cited

U.S. PATENT DOCUMENTS 3,102,159 A * 8/1963 Ford ...................... D21H 17/07 162/138
3,617,438 A * 11/1971 Nakao .................... D21H 5/143 264/188
(Continued)

FOREIGN PATENT DOCUMENTS

CN 111145936 A 5/2020
EP 1243697 A1 9/2002
(Continued)

OTHER PUBLICATIONS

International Preliminary Report on Patentability for the corresponding International Application No. PCT/IB2023/058290; International Filing Date: Aug. 18, 2023; Date of Mailing: Jul. 15, 2024; 13 pages.
(Continued)

*Primary Examiner* — Timothy J Thompson
*Assistant Examiner* — Rhadames Alonzo Miller
(74) *Attorney, Agent, or Firm* — CANTOR COLBURN LLP

(57) ABSTRACT

This disclosure relates to an electrical insulation paper comprising at least 25% content by weight of cellulose fibers based on the total weight of the electrical insulation paper, 8% content by weight of synthetic fibers based on the total weight of the electrical insulation paper, and a thermal stabilizer comprising nitrogen, wherein a content by weight of the nitrogen constitutes between 1% and 4% of the content by weight of the cellulose fibers.

16 Claims, 7 Drawing Sheets

(51) Int. Cl.

| | |
|---|---|
| ***D21H 13/40*** | (2006.01) |
| ***D21H 17/07*** | (2006.01) |
| ***D21H 27/00*** | (2006.01) |
| ***H01B 19/02*** | (2006.01) |

(56) References Cited

U.S. PATENT DOCUMENTS

| | | | | |
|---|---|---|---|---|
| 3,814,622 | A * | 6/1974 | Isshiki et al. | D06M 15/31 442/117 |
| 4,060,451 | A * | 11/1977 | Uchiyama | C08G 73/18 162/146 |
| 4,407,697 | A * | 10/1983 | Sadler | D21H 17/22 162/137 |
| 4,450,424 | A * | 5/1984 | Sadler | H01F 27/324 162/158 |
| 6,980,076 | B1 * | 12/2005 | Rolling | H01B 3/52 174/124 R |
| 2005/0038226 | A1 * | 2/2005 | Ratzsch | C08G 73/0644 528/362 |
| 2010/0039199 | A1 | 2/2010 | Weinberg | |
| 2013/0255899 | A1 * | 10/2013 | Krahn | D04H 1/5412 264/331.19 |
| 2013/0260123 | A1 * | 10/2013 | Krahn | D21H 5/2671 525/418 |
| 2013/0260124 | A1 * | 10/2013 | David | D21H 5/2671 428/220 |
| 2014/0178661 | A1 * | 6/2014 | Adjei | D21H 13/26 162/138 |
| 2015/0083353 | A1 * | 3/2015 | Kleemann | H01B 3/52 162/138 |
| 2015/0371730 | A1 * | 12/2015 | Aida | D21H 11/20 428/479.6 |

FOREIGN PATENT DOCUMENTS

| | | | |
|---|---|---|---|
| EP | 1297540 | B1 | 5/2006 |
| EP | 2701162 | A1 | 2/2014 |
| EP | 2222917 | B1 | 3/2014 |
| EP | 2222918 | B1 | 6/2014 |
| EP | 2588304 | B1 | 8/2014 |
| EP | 3154779 | B1 | 5/2020 |
| EP | 2867012 | B2 | 7/2020 |
| JP | S59222346 | A | 12/1984 |

OTHER PUBLICATIONS

International Search Report and Written Opinion for the corresponding International Application No. PCT/IB2023/058290; International Filing Date: Aug. 18, 2023; Date of Mailing: Nov. 21, 2023; 13 pages.

Ferrito, S J et al., "High Temperature Reinforced Cellulose Insulation for Use in Electrical Applications", copyright 2001, IEEE, pp. 684-687.

Ferrito, S J et al., "Thermal Endurance of High Temperature Fiber Reinforced Cellulose Insulation", Cooper Power Systems, USA, CIRED2001, Jun. 18-21, 2001, Conference Publication No. 482, Copyright IEE 2001, 4 pages.

Office Action for the corresponding Chinese Application No. 2023800606038, Date of Issue: Jul. 23, 2025; 8 pages (English translation).

* cited by examiner

ELECTRICAL INSULATION PAPER

CROSS-REFERENCE TO RELATED APPLICATIONS

This application is a National Stage application of PCT/IB2023/058290, filed Aug. 18, 2023, which claims priority to European Patent Application Number 22306242.3, filed Aug. 19, 2022, both of which are incorporated herein in their entirety.

TECHNICAL FIELD

The present disclosure relates to an electrical insulation paper. The present disclosure further concerns a method for its manufacture and cables, transformers, capacitors, and/or other items of electrical equipment that are equipped with such an electrical insulation paper.

TECHNICAL BACKGROUND

The invention relates to an electrical insulation paper. The invention further concerns a method for its manufacture and cables, transformers, capacitors, and/or other items of electrical equipment that are equipped with such an electrical insulation paper.

Electrical insulation papers are used for electrical insulation in a variety of apparatuses, such as, for example, transformers, cables and capacitors, and in particular in liquid-filled transformers, cables and capacitors.

There is a particular interest in materials with good mechanical and electrical properties that can be produced at low cost in comparison with Nomex® based paper.

Electrical insulation papers comprising cellulose have become known and play an important role in the field of electrical insulation. Cellulose-based insulation papers combine good electrical insulation with good mechanical properties, and they can be produced cheaply. However, for example in liquid immersed transformers, insulation papers are exposed to various thermal, chemical, and/or oxidant stresses which may cause rapid ageing of the cellulose. The ageing shows in the form of a loss of tensile strength and is prone to cause a failure of the transformer.

It would be desirable to be able to provide smaller transformers and other electrical equipment, without compromising on the electrical insulation, and the operation temperature and/or runtime limits of known devices are not always satisfying. It would also be desirable to provide transformers having the same size as the existing ones but able to run at higher temperatures.

It is an object of the present disclosure to address at least one of the shortcomings of the state of the art.

SUMMARY

Aspects of the above-mentioned object are achieved by an electrical insulation paper in accordance with the present disclosure.

One aspect of the present disclosure relates to an electrical insulation paper. The electrical insulation paper comprises at least 25% content by weight of cellulose fibers based on the total weight of the electrical insulation paper, at least 5% content by weight of synthetic fibers based on the total weight of the electrical insulation paper, a thermal stabilizer comprising nitrogen, wherein a content by weight of the nitrogen constitutes between 1% and 4% of the content by weight of the cellulose fibers. The synthetic fibers comprise aliphatic polyamide fibers and/or glass fibers.

Another aspect of the present disclosure relates to a method of manufacturing an electrical insulation paper. The method comprises the steps of providing cellulose fibers and synthetic fibers and of manufacturing a base paper from the cellulose fibers and synthetic fibers on a paper machine, with at least 25% content by weight of the cellulose fibers based on the total weight of the electrical insulation paper, and at least 5% content by weight of the synthetic fibers based on the total weight of the electrical insulation paper. Another aspect of the present disclosure is an electrical insulation paper comprising at least one layer made by the method described herein.

Another aspect of the present disclosure is the use of the electrical insulation disclosed herein for insulating wires of high-voltage liquid-immersed transformers or dry transformers, or for insulating of wires used in traction transformers or for a low voltage foil winding in distribution transformers. Phrase alternatively, another aspect is a transformer comprising wires insulated with the electrical insulation paper described herein or a transformer comprising a low voltage foil winding comprising the electrical insulation paper as described herein.

DETAILED DESCRIPTION

The Electrical Insulation Paper

Figure 1:
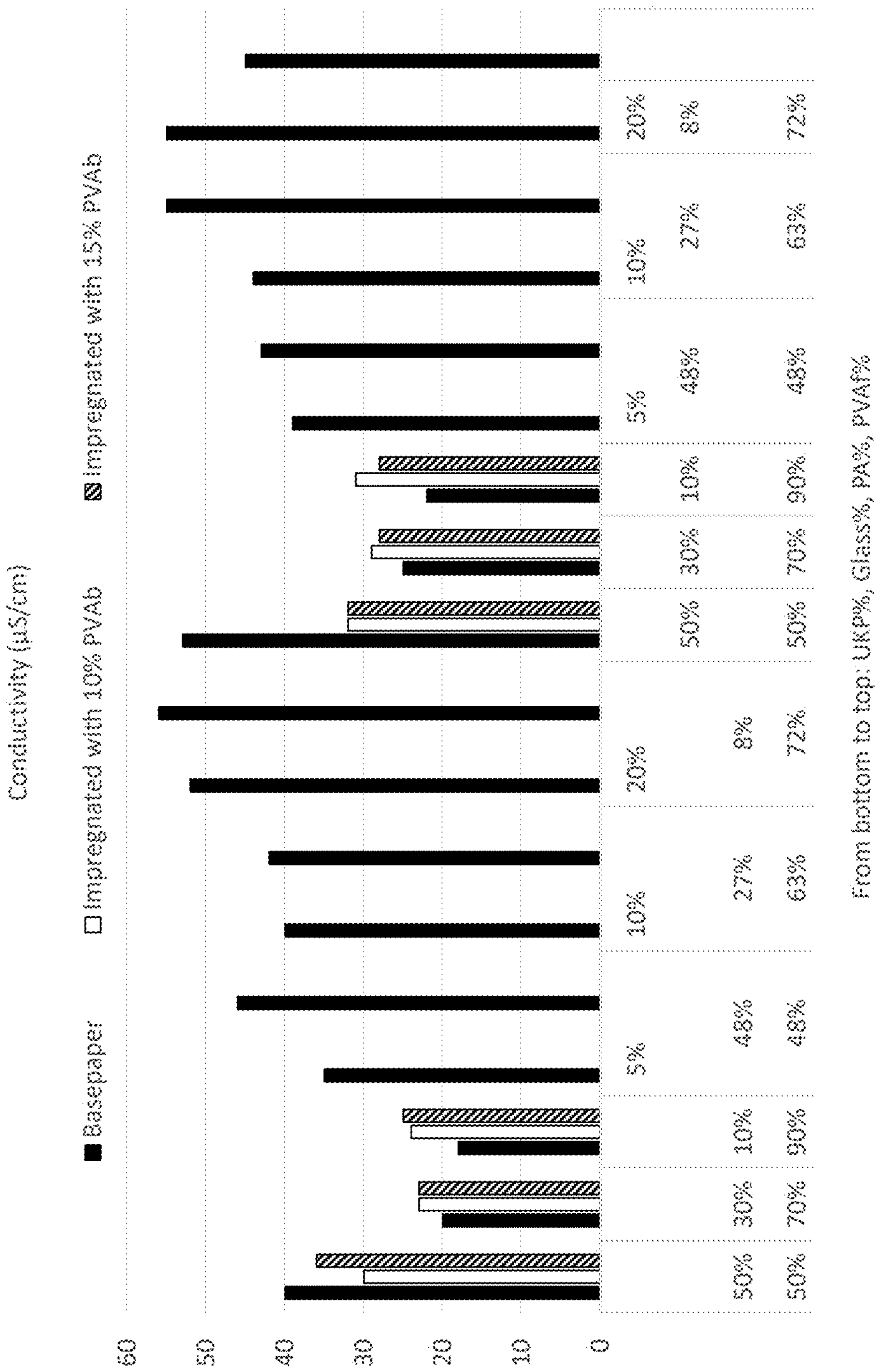
FIG. 1 is a chart of the conductivity of examples of electrical insulation paper.

The electrical insulation paper can comprise at least 25%, at least 39%, at least 41%, at least 45%, at least 48%, at least 50%, at least 65%, or at least 71% by weight of cellulose fibers based on the total weight of the electrical insulation paper. The electrical insulation paper can comprise, for example, up to 94, up to 92, up to 91, up to 86, or up to 66 percent by weight cellulose fibers based on the total weight of the electrical insulation paper.

According to some embodiments, the cellulose fibers comprise one or several of the following: Kraft fibers, cotton fibers, linen fibers, hemp fibers, and wherein the cellulose fibers are unbleached, bleached, and/or semi-bleached, hardwood and/or softwood fibers.

The electrical insulation paper can comprise, at least 5%, 5 to 55%, 7 to 35%, or 8 to 25% of synthetic fibers based on the total weight of the electrical insulation paper, The synthetic fibers comprise polyamide fibers, glass fibers or a combination thereof. The polyamide fibers can be for example, aliphatic polyamide fibers, or a blend of polyamide fibers, such as aliphatic polyamide fibers. The synthetic fibers may promote a higher tensile strength retention of the electrical insulation paper. More generally, the synthetic fibers provide good strength parameters to the electrical insulation paper.

The electrical insulation can comprise a thermal stabilizer comprising nitrogen wherein a content by weight of the nitrogen constitutes between 1% and 4%, 1.2 to 2.3% or 1.2 to 1.6% of the content by weight of the cellulose fibers. The thermal stabilizer may promote a good stability against ageing, that is to say the thermal stabilizer may extend the lifetime of the insulating material. The thermal stabilizer can be, for example the thermal stabilizer comprising nitrogen is chosen among dicyandiamide, urea, melamine, polyacrylamide, or mixture thereof.

The electrical insulation papers in accordance with the present disclosure can, for example, have a relative thermal endurance index of 140° C. or more. Within the context of the present disclosure, the thermal class of an insulating material or of an insulating system is considered to be defined by the IEC 60085 norm, i.e., as a "designation that is equal to the numerical value of the recommended maximum continuous use temperature in degrees Celsius". According to IEC 60085, thermal classes are assigned to a material or a system based on its Relative Thermal Endurance (RTE) index. An insulating material can be a solid (e.g., a paper) or a fluid (e.g., a mineral oil). In a power transformer, the combination of various insulating materials forms an insulating system.

The RTE index of a material or system is the temperature at which an endpoint (for example, 50% tensile retention of the insulating material) is reached after a given time which is needed to reach the same endpoint for a reference material or system (e.g. a non-thermally upgraded (non-TU) paper and a mineral oil) with a known thermal endurance. The thermal endurance of a non-TU paper in mineral oil is 105° C.

Due to the high thermal class of electrical insulation papers in accordance with the present disclosure, they may be particularly suitable for use in liquid-immersed transformers where the liquid could be mineral oil or ester.

The RTE of a system can be determined following the IEC 60332-2 which is based on accelerated tests of ageing in sealed tube at different temperatures and for different durations. For instance, in comparison with a reference, the system is submitted to 1 or 3 different ageing tests and should have equal or higher tensile retention than the reference but for higher temperature (+10 to 60° C.) depending on the expected increase in thermal class. The standard IEEE C57.100 gives an explicit description of the experimental part to conduct such accelerated tests.

The electrical insulation papers in accordance with the present disclosure may have a higher RTE (+10 to 60° C.) than comparable papers in accordance with the prior art, but with a comparably higher tensile retention.

The electrical insulation paper can have a good mechanical strength. This facilitates processing, such as wrapping the wires and conductors.

The electrical insulation paper can also provide mechanical properties that enable it to be wound around a conductor in a technically practical manner. The electrical insulation paper may thus allow providing smaller transformers and other electrical equipment, without compromising on the electrical insulation, and the operation temperature and/or runtime limits. The electrical insulation paper may also allow to provide transformers having the same size as the existing ones but that are able to run at higher temperatures.

In other words, electrical insulation papers in accordance with the present disclosure can allow withstanding high electrical potential gradients, while offering benefits over the alternative of using very thin papers in accordance with the state of the art, since by the reduction of their thickness whilst other properties remain constant, the breakdown strength, i.e. the dielectric strength, is increased. In this regard, the mechanical properties relating to the strength of the insulation paper may be impaired when the papers are very thin, and this in turn impairs the industrial viability of the winding process, so that on its own this does not represent a practical solution. The electrical insulation papers in accordance with the present disclosure may offer a solution.

The electrical insulation paper may comprise at least 50% content by weight of cellulose fibers based on the total weight of the electrical insulation paper and 7 to 35% content by weight of synthetic fibers based on the total weight of the electrical insulation paper, said synthetic fibers being polyamide fibers, such as aliphatic polyamide fibers, or a blend of polyamide fibers, such as aliphatic polyamide fibers, and glass fibers.

The electrical insulation paper may comprise at least 65% content by weight of cellulose fibers based on the total weight of the electrical insulation paper and 7 to 27% content by weight of synthetic fibers based on the total weight of the electrical insulation paper, said synthetic fibers being polyamide fibers, such as aliphatic polyamide fibers, or a blend of polyamide fibers, such as aliphatic polyamide fibers, and glass fibers.

The electrical insulation paper may comprise at least 65% content by weight of cellulose fibers based on the total weight of the electrical insulation paper and 8 to 25% content by weight of synthetic fibers based on the total weight of the electrical insulation paper, said synthetic fibers being polyamide fibers, such as aliphatic polyamide fibers, or a blend of polyamide fibers, such as aliphatic polyamide fibers, and glass fibers.

The electrical insulation paper may comprise at least 45% content by weight of cellulose fibers based on the total weight of the electrical insulation paper and 5 to 55% content by weight of synthetic fibers based on the total weight of the electrical insulation paper, said synthetic fibers being glass fibers, or a blend of glass fibers and of polyamide fibers, such as aliphatic polyamide fibers.

The electrical insulation paper may comprise at least 50% content by weight of cellulose fibers based on the total weight of the electrical insulation paper and 7 to 42% content by weight of synthetic fibers based on the total weight of the electrical insulation paper, said synthetic fibers being glass fibers, or a blend of glass fibers and of polyamide fibers, such as aliphatic polyamide fibers.

The electrical insulation paper may comprise at least 50% content by weight of cellulose fibers based on the total weight of the electrical insulation paper and 8 to 25% content by weight of synthetic fibers based on the total weight of the electrical insulation paper, said synthetic fibers being glass fibers, or a blend of glass fibers and of polyamide fibers, such as aliphatic polyamide fibers.

When the synthetic fibers are glass fibers, these glass fibers may have a length of 3 to 32 mm, preferably of 3 to 20 mm, more preferably of 3 to 13 mm. Furthermore, these glass fibers may have a diameter of 3 to 30 μm, preferably of 6 to 20 μm, more preferably of 8 to 15 μm.

When the synthetic fibers are polyamide fibers, these polyamide fibers may have a length of 2 to 12 mm, preferably of 3 to 8 mm. The polyamide fibers may have a linear density of 0.4 to 7.0 dtex (decitex), and preferably of 1.2 to 2.0 dtex.

The electrical insulation paper may further comprise a binder in an amount of 5 to 20% content by weight based on the total weight of the electrical insulation paper. The binder may be chosen among thermofusible fibers, resin, or mixtures thereof.

The binder may be a resin. A resin may increase the mechanical strength parameters of the electrical insulation paper.

In this context, a resin may in particular be a liquid having a viscosity below 100 centipoise (cP) at 50° C., optionally in the range of 10-75 cP at 50° C. The resin can be pure or diluted to reach this viscosity in order to enable its impregnation or coating on the paper substrate.

The resin may comprise the thermal stabilizer comprising nitrogen.

According to some embodiments, the binder comprises a polyvinyl alcohol. The polyvinyl alcohol may be a homopolymer. As another example, the polyvinyl alcohol can be a modified polyvinyl alcohol, such as copolymer of vinyl alcohol with another ethylenically unsaturated monomer, such as ethylene. As a specific example the modified polyvinyl alcohol can comprise poly(vinyl alcohol-co-ethylene). In an example the binder comprises a mixture of polyvinyl alcohol and of modified polyvinyl alcohol, such as poly (vinyl alcohol-co-ethylene). The polyvinyl alcohol and/or modified polyvinyl alcohol binder can have degree of hydrolysis of at least 88 mol %. The polyvinyl alcohol (e.g., PVA or the modified polyvinyl alcohol) can be a low ash content polymer.

When the binder is a mixture of polyvinyl alcohol and of modified polyvinyl alcohol, the polyvinyl alcohol and the modified polyvinyl alcohol can be blended in a weight ratio of 1:5 to 5:1, 1:3 to 3:1, or 1:1.

The binder can comprise thermofusible fibers. For example, the electrical insulation paper may comprise 5 to 18%, 9 to 17%, or 10 to 16% content by weight of thermofusible fibers based on the total weight of the electrical insulation paper. The thermofusible fibers may provide a higher tensile strength to the paper. The increasingly narrower indicate ranges of the presence of the thermofusible fibers may to an increasing degree promote high tensile strength, without therefore compromising on other desirable properties. The thermofusible fibers may have a length of 2 to 12 mm, or 3 to 8 mm. The thermofusible fibers may have a linear density of 0.4-7.0 dtex, or 1.2 to 2.0 dtex (decitex).

The electrical insulation paper may comprise the cellulose fibers, the glass fibers, the thermal stabilizer comprising nitrogen (all of the preceding components comprised to at a weight % in the mentioned range), a binder, and a remainder that does not constitute more than 1%, optionally 0.5% or 0.1% based on the total weight of the electrical insulation paper.

Method of Manufacture.

Also disclosed herein is a method of manufacture of electrical insulation papers including providing cellulose fibers and synthetic fibers; manufacturing a base paper from the cellulose fibers and the synthetic fibers on a paper machine, with at least 25% content by weight of the cellulose fibers based on the total weight of the electrical insulation paper, and at least 5% content by weight of the synthetic fibers based on the total weight of the electrical insulation paper; and adding a thermal stabilizer comprising nitrogen, wherein a content by weight of the nitrogen constitutes between 1% and 4% of the content by weight of the cellulose fibers. The method may further comprise adding a thermal stabilizer comprising nitrogen, wherein a content by weight of the nitrogen constitutes between 1% and 4% of the content by weight of the cellulose fibers.

The description and amounts of the cellulose fibers, synthetic fibers, thermal stabilizer and optional binder are as discussed above in regard to the electrical insulation paper.

The method can comprise a step of adding a binder in an amount of 5 to 20% by weight based on the total weight of the electrical insulation paper. The binder can be thermofusible fibers, a resin, or mixtures thereof.

Where the binder is a resin, the resin can be applied (e.g. coated or impregnated) on the base paper, for example, after the addition of the thermal stabilizer comprising nitrogen. As another example, said the resin can be coated on the base paper just after the step of manufacturing the base paper and before the addition of the thermal stabilizer comprising nitrogen. As another example, the resin can include the thermal stabilizer comprising nitrogen.

When the binder is a resin, this resin can be applied on the base paper online on the paper machine or offline.

The binder, particularly a resin binder, may be applied by size press, e.g., corresponding to an impregnation step, or by another coating method, such as bar coating, road coating, roll coating, or the like.

Where the binder comprises thermofusible fibers, said thermofusible fibers can be mixed with the cellulosic and synthetic fibers before the manufacturing step of the base paper.

According to some embodiments, the binder is a resin, said resin also comprising the thermal stabilizer comprising nitrogen, said resin being coated on the base paper just after the manufacturing step of said base paper.

The base paper may be manufactured with a weight content of thermofusible fibers of 8 to 18%. The base paper may be manufactured with a weight content of thermofusible fibers of 9 to 17%. The base paper may be manufactured with a weight content of thermofusible fibers of 10 to 16%.

The thermofusible fibers may have a length of 2 to 12 mm. The thermofusible fibers may have a length of 3 to 8 mm.

The thermofusible fibers may have a linear density of 0.4-7.0 dtex (decitex).

The thermofusible fibers may have a linear density of 1.2-2.0 dtex (decitex).

According to an example, the electrical insulation paper is manufactured with a liquid binder. The liquid binder may comprise the thermal stabilizer comprising nitrogen.

The binder may comprise a polyvinyl alcohol as described herein, —e.g. polyvinyl alcohol, a modified polyvinyl alcohol such as poly(vinyl alcohol-co-ethylene) or a blend or mixture thereof. The polyvinyl alcohol binder can have a degree of hydrolysis of at least 88 mol %.

The method can comprise a step, after the step of adding the thermal stabilizer comprising nitrogen or of coating the base paper with the resin, of hot calendaring the base paper at a temperature in a range of 120° C. to 160° C. and with a pressure in a range of 800 dekanewtons (daN) to 1200 daN.

The manufacturing may comprise (according to some embodiments: consist of) manufacturing a base paper from the cellulose fibers and synthetic fibers on a paper machine, with at least 50% content by weight of the cellulose fibers based on the total weight of the electrical insulation paper, and 7 to 35% content by weight of the synthetic fibers based on the total weight of the electrical insulation paper, said synthetic fibers being polyamide fibers, such as aliphatic polyamide fibers, or a blend of polyamide fibers, such as aliphatic polyamide fibers, and glass fibers.

The content by weight of the cellulose fibers based on the total weight of the electrical insulation paper may be at least 65%.

The content by weight of the polyamide fibers based on the total weight of the electrical insulation paper may be 7 to 27%.

The content by weight of the polyamide fibers based on the total weight of the electrical insulation paper may be 8 to 25%.

The manufacturing may comprise (according to some embodiments: consist of) manufacturing a base paper from the cellulose fibers and synthetic fibers on a paper machine, with at least 45% content by weight of the cellulose fibers based on the total weight of the electrical insulation paper, and 5 to 55% content by weight of the synthetic fibers based on the total weight of the electrical insulation paper, said synthetic fibers being glass fibers, or a blend of glass fibers and polyamide fibers, such as aliphatic polyamide fiber.

The content by weight of the cellulose fibers based on the total weight of the electrical insulation paper may be at least 65%.

The content by weight of the glass fibers based on the total weight of the electrical insulation paper may be 7 to 42%.

The content by weight of the glass fibers based on the total weight of the electrical insulation paper may be 8 to 25%.

Another aspect of the present disclosure relates to an insulation paper comprising at least one layer manufactured in accordance with any one or several aspects of the method described above.

The paper may be creped, creped and calendared, and/or printed with epoxy squares to form a so-called diamond dot paper. The paper may also be an extensible paper that has an improved stretch for conformability to the windings but that is obtained through a process that differs from the creping process. For example, the extensibility of a so-called extensible paper is obtained on the paper machine by the presence of a unit composed, among others, of a moving rubber blanket carrying the paper, when moist, through a nip, causing a shrinkage before the nip and then a compaction (microcreping) in the Machine Direction (MD) after the nip.

The present disclosure also relates to the use of an electrical insulation paper in accordance with any one or several aspects discussed above for insulating wires of high-voltage liquid-immersed transformers or dry transformers.

The present disclosure also relates to the use of an electrical insulation paper in accordance with any one or several aspects discussed above for insulating of wires used in traction transformers.

The present disclosure also relates to the use of an electrical insulation paper in accordance with any one or several aspects discussed above for a low voltage foil winding in distribution transformers.

Another aspect of the present disclosure relates to a high-voltage liquid-immersed transformer comprising at least one wire that is insulated by the electrical insulation paper according to any one or several of the aspects described above.

Another aspect of the present disclosure relates to a dry transformer comprising at least one wire that is insulated by the electrical insulation paper according to any one or several of the aspects described above.

Another aspect of the present disclosure relates to a traction transformer comprising at least one wire that is insulated by the electrical insulation paper according to any one or several of the aspects described above.

Another aspect of the present disclosure relates to a distribution transformer with at least one low voltage foil winding comprising the electrical insulation paper according to any one or several of the aspects described above.

Another aspect of the present disclosure relates to insulating press papers as well as transformer board insulation or molded fiber insulation parts used in transformers.

Additional advantages and features of the present disclosure, that can be realized on their own or in combination with one or several features discussed above, insofar as the features do not contradict each other, will become apparent from the following description of particular embodiments.

In the following, the following abbreviations will be used:

PVAb refers to polyvinyl alcohol binder in the form of a resin;

PVAmb refers to modified polyvinyl alcohol in the form of a resin;

PVAf refers to polyvinyl alcohol in the form of fibers;

PA refers to polyamide; and

UKP refers to unbleached kraft fibers

EXAMPLES

For a better understanding of the present disclosure and to show how the same may be carried into effect, reference will now be made, by way of example only, to examples in accordance with the present disclosure and to experimental data concerning these.

Examples of electrical insulation papers in accordance with the present disclosure were manufactured using a pilot paper machine.

A first set of electrical insulation papers was manufactured from cellulose fibers and glass fibers. As cellulose fibers, unbleached Kraft fibers (UKP) were used. However, the present disclosure is not limited thereto. For example, also bleached Kraft fibers or other cellulose fibers may be used. The cellulosic fibers may, e.g., be cotton fibers, linen fibers, hemp fibers, bleached, unbleached, or semi-bleached, softwood or hardwood, or any mix of the mentioned fibers and the like. Specifically, base papers were manufactured with different cellulose and glass fiber content ratios, namely a first series, with 50% content by weight of cellulose fibers and 50% content by weight of glass fibers, a second series, with 70% content by weight of cellulose fibers and 30% content by weight of glass fibers, and a third series, with 90% content by weight of cellulose fibers and 10% content by weight of glass fibers. These three series with the mentioned different content ratios will in the following be referred to as example series 1, 2, and 3.

A second set of electrical insulation papers was manufactured from cellulose fibers, glass fibers, and thermofusible fibers. In this case, thermofusible fibers with a length in the range of 2 to 12 mm and a linear density in the range of 0.4 to 7 dtex (decitex) were used. In particular, thermofusible fibers with a length in the range of 3 to 8 mm and a linear density in the range of 1.2 to 2.0 dtex (decitex) were used. As cellulose fibers, UKP were used. However, the present disclosure is not limited thereto. Other cellulose fibers may be used, as discussed above. Specifically, base papers were manufactured with different cellulose, glass, and thermofusible fiber content ratios. A series was manufactured with 47.5% content by weight of cellulose fibers, 47.5% content by weight of glass fibers, and 5% content by weight of thermofusible fibers comprising polyvinyl alcohol fibers (PVAf). In the following, this series will be referred to as example series 4. In addition, a series was manufactured with 63% content by weight of cellulose fibers, 27% content by weight of glass fibers, and 10% content by weight of thermofusible fibers comprising PVAf. In the following, this series will be referred to as example series 5. A series was also manufactured with 72% content by weight of cellulose fibers, 8% content by weight of glass fibers, and 20% content by weight of thermofusible fibers comprising PVAf. In the following, this series will be referred to as example series 6.

In the first and second sets of insulation papers, glass fibers having a length of 3 to 32 mm and a diameter of 3 to 30 μm were used. In particular, glass fibers having a length of 3 to 20 mm and a diameter of 6 to 20 μm were used. More particularly, glass fibers having a length of 3 to 13 mm and a diameter of 8 to 15 μm were used.

A third set of electrical insulation papers was manufactured from cellulose fibers and polyamide (PA) fibers. As cellulose fibers, UKP were used. However, the present disclosure is not limited thereto. For example, other cellulose fibers may be used. Specifically, base papers were manufactured with different cellulose and PA fiber content ratios, namely a series with 50% content by weight of cellulose fibers and 50% content by weight of PA fibers, a series with 70% content by weight of cellulose fibers and 30% content by weight of PA fibers, and a series with 90% content by weight of cellulose fibers and 10% content by weight of PA fibers. These three series will in the following be referred to as example series 7, 8, and 9.

A fourth set of electrical insulation papers was manufactured from cellulose fibers, PA fibers, and thermofusible fibers. In this case, thermofusible fibers with a length in the range of 2 to 12 mm and a linear density in the range of 0.4 to 7 dtex (decitex) were used. In particular, thermofusible fibers with a length in the range of 3 to 8 mm and a linear density in the range of 1.2 to 2.0 dtex (decitex) were used. As cellulose fibers, UKP were used. However, the present disclosure is not limited thereto. For example, other cellulose fibers may be used. Specifically, base papers were manufactured with different cellulose, PA, and thermofusible fiber content ratios, namely a series with 47.5% content by weight of cellulose fibers, 47.5% content by weight of PA fibers, and 5% content by weight of thermofusible fibers comprising PVAf. In the following, this series will be referred to as example series 10. In addition, a series was manufactured with 63% content by weight of cellulose fibers, 27% content by weight of PA fibers, and 10% content by weight of thermofusible fibers comprising PVAf. In the following, this series will be referred to as example series 11. A series was also manufactured with 72% content by weight of cellulose fibers, 8% content by weight of PA fibers, and 20% content by weight of thermofusible fibers comprising PVAf. In the following, this series will be referred to as example series 12.

In the third and fourth sets of electrical insulation papers, the PA fibers having a length of 2 to 12 mm and a linear density of 0.4 to 7.0 dtex were used. In particular, PA fibers having a length of 3 to 8 mm and a linear density of 1.2 to 2.0 dtex were used.

In addition, amongst example series 4, 5, 6, 10, 11, and 12, a part of the base papers was hot calendered and a part was not calendered. In the present experiments, calendering at 140° C., with a pressure of 1000 daN, and with one pass per side was used. However, the present disclosure is not limited thereto.

Moreover, each of the series 1-12 were manufactured in different variants (three different rates of two different polyvinyl alcohol binders (PVAb) were used). Some of the series were manufactured with and without a thermal stabilizer comprising nitrogen, dicyandiamide (Dicy). The Dicy was adjusted to satisfy 1.9% weight content based on the cellulose fibers.

The following Table 1 summarizes the manufacturing parameters for the different variants of the mentioned example series 1-6 that were manufactured. For example, for Series 1, all samples included 50% cellulose fiber and 50% glass fiber without calendaring. The amount and type of binder and the addition or lack of addition of Dicy was varied to provide ten types of samples. For example, the first sample used Binder 1 in an amount of 13.5% without addition of Dicy. As another example Series 4 used 48% cellulose fibers, 48% glass fibers and PVAf fibers as the binder with and without addition of Dicy. Table 2 summarizes the manufacturing parameters for the different variants of the mentioned example series 7-12 that were manufactured.

TABLE 1

Example Series 1-6

| | Example Series | | 1 | 2 | 3 | 4 | 5 | 6 |
|---|---|---|---|---|---|---|---|---|
| Basepapers | Cellulose | | 50% | 70% | 90% | 48% | 63% | 72% |
| | Synthetic | Glass | 50% | 30% | 10% | 48% | 27% | 8% |
| | | PA | | | | | | |
| | | PVAf | | | | 5% | 10% | 20% |
| | Calendaring | | no | no | no | no yes | no yes | no yes |
| Lab impregnation (% of basepapers) | Binder 1 w/o Dicy | content "15" | 13.5% | 14.5% | 15.1% | | | |
| | | content "10" | 9.5% | 9.8% | 11% | | | |
| | | content "7" | 7.,4% | 7.,4% | 7.,1% | | | |
| | Binder 2 w/o Dicy | content "7" | 7.1% | 7.4% | 6.2% | | | |
| | | content "5" | 4.8% | 4.7% | 5% | | | |
| | | content "3" | 2.6% | 2.5% | 3.9% | | | |
| | No binder with Dicy 1.9% N based on cell. fbrs. | | yes | yes | yes | yes | yes | yes |

TABLE 1-continued

| Example Series 1-6 | | | | | | | | |
|---|---|---|---|---|---|---|---|---|
| | Example Series | | 1 | 2 | 3 | 4 | 5 | 6 |
| | Binder 1 with Dicy 1.9 % N based on cell. fbrs. | content "15" | 13.2% | 14.5% | 15.4% | | | |
| | | content "10" | 9.8% | 10.2% | 12.3% | | | |
| | | content "7" | 7.4% | 7.6% | 7.1% | | | |

TABLE 2

| Example Series 7-12 | | | | | | | | |
|---|---|---|---|---|---|---|---|---|
| | Example Series | | 7 | 8 | 9 | 10 | 11 | 12 |
| Basepapers | Cellulose | | 50% | 70% | 90% | 48% | 63% | 72% |
| | Synthetic | Glass | | | | | | |
| | | PA | 50% | 30% | 10% | 48% | 27% | 8% |
| | | PVAf | | | | 5% | 10% | 20% |
| | Calendaring | | No | no | no | no yes | no yes | no yes |
| Lab impregnation (% of basepapers) | Binder 1 w/o Dicy | content "15" | 15.8% | 14.8% | 15.6% | | | |
| | | content "10" | 11.2% | 10.9% | 10.6% | | | |
| | | content "7" | 8.4% | 7.9% | 6.8% | | | |
| | Binder 2 w/o Dicy | content "7" | 7.7% | 7.9% | 6.3% | | | |
| | | content "5" | 5.3% | 5.1% | 5% | | | |
| | | content "3" | 2.9% | 2.7% | 3.9% | | | |
| | No binder with Dicy 1.9% N based on cell. fbrs. | | yes | yes | yes | yes | yes | yes |
| | Binder 1 with Dicy 1.9 % N based on cell. fbrs. | content "15" | 15.7% | 14.5% | 15.2% | | | |
| | | content "10" | 10.9% | 11.1% | 10.8% | | | |
| | | content "7" | 8.1% | 7.9% | 6.8% | | | |

The conductivity of the different variants of the manufactured example series was examined, both after manufacturing, as well after aging. Results are shown in FIG. 1. Specifically, FIG. 1 shows conductivity in μS/cm of aqueous extracts measured according to IEC60554-2 of unimpregnated basepapers (black), impregnated with 10% polyvinyl alcohol binder (PVAb) 1 (white) and with 15% PVAb 1 (hatched). Legend of horizontal axis from bottom to top: Cellulose %, Glass %, PA %, PVAf %.

Figure 2:
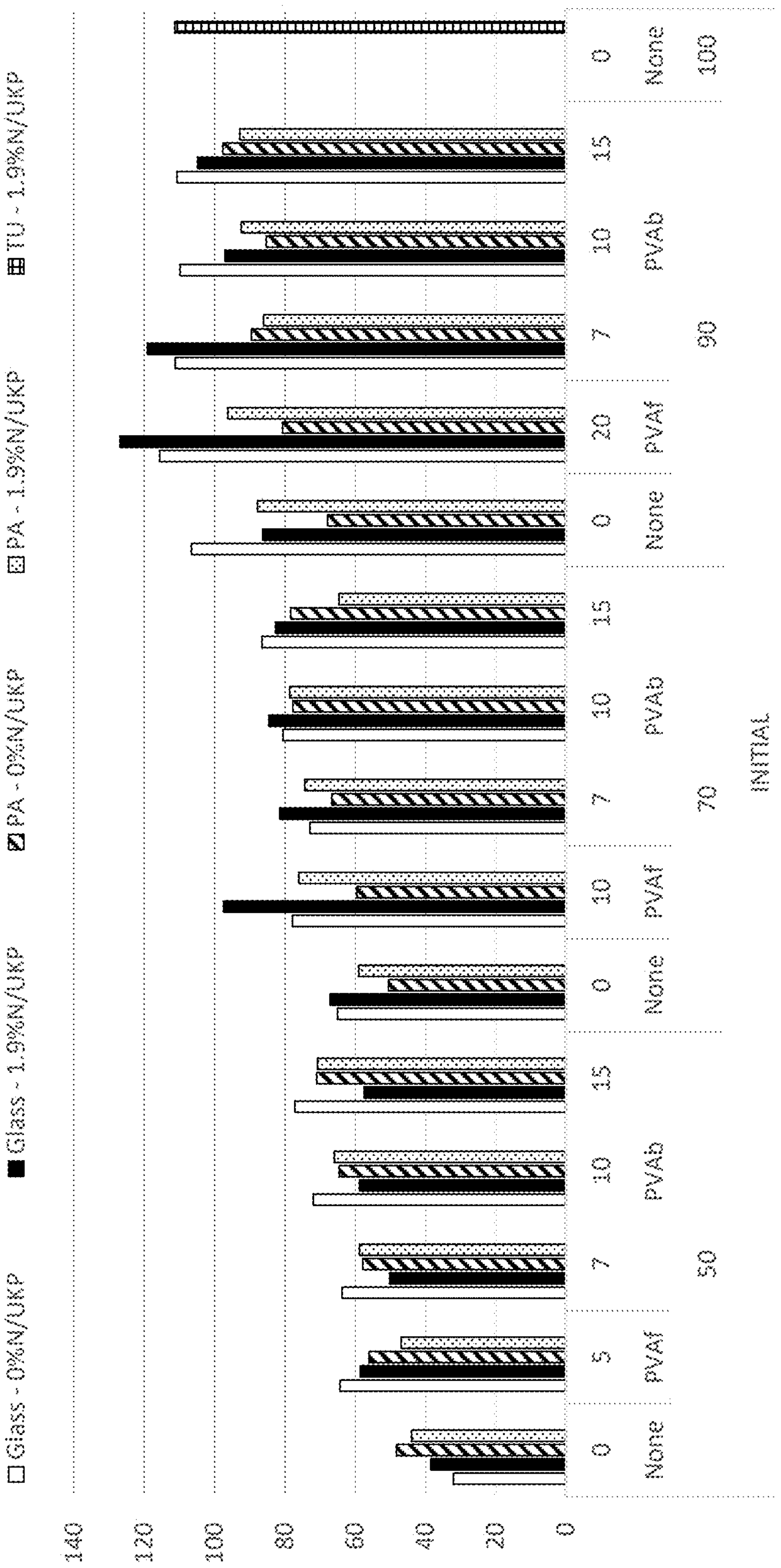
FIG. 2 is a chart of the initial tensile index of examples of electrical insulation paper.

Samples were also tested for initial tensile index in Nm/g using ISO1924 standard Results are shown in FIG. 2 with and without Dicy and with and without polyvinyl alcohol resin (in the form of PAVb or PVAf). Legend of horizontal axis from bottom to top: Cellulose %, Presence and type of PVA, PVA %). The white and hatched bars do not include the thermal stabilizer and use glass or polyamide, respectively. The black and dot filled bars used glass and polyamide, respectively with Dicy as thermal stabilizer. In FIG. 2, the acronym TU is used to illustrate a thermally upgraded paper according to IEC 60076-14 standard.

From FIG. 2, it can be observed that the use of PVAf slightly increase the initial tensile strength. The use of a PVAb increases the initial tensile strength even more. For example, the examples with a content of 50% non-cellulosic fibers and a high content of PVAb have a very high initial tensile strength. It appears that the use of PVAf increases the initial tensile index of the examples containing 30% or 10% of non-cellulosic fibers.

Moreover, a simplified and fast ageing test was developed, to promote the main degradation mechanism of the cellulosic material in a liquid-immersed transformer, the acid hydrolysis: the paper, with its initial moisture (approximatively 7%) after conditioning at 50% relative humidity (RH) and 23° C., is put in a sealed container of 0.5 L with air at 50% RH and placed in an oven for a given time and temperature. Tests were, for example, performed at 140° C., until 50% tensile retention was reached. The simplified ageing test is particularly fast due to the presence of water. The latter promotes the acid hydrolytic degradation.

Ageing tests were in particular performed on the different manufactured example series. Specifically, the tensile index retention (as a percentage of the initial tensile index was evaluated). Accelerated ageing tests were performed by exposing the manufactured electrical insulation papers to 155° C. for three days in sealed tubes with trapped moisture. The results are shown in FIG. 3.

Figure 5:
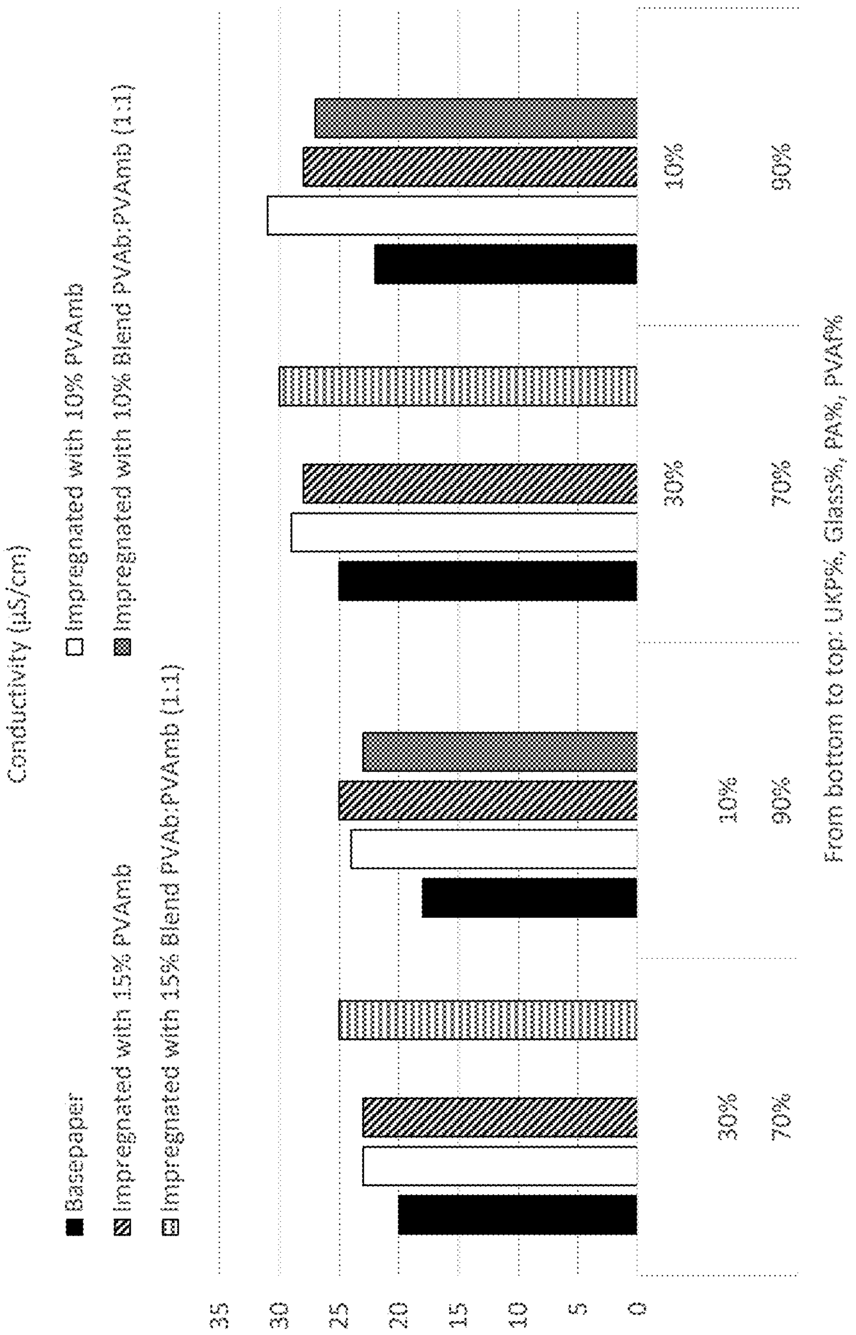
FIG. 5 is a chart of the conductivity of examples of electrical insulation paper.

In FIG. 5, the tensile index retention in % of the prototypes with/without Dicy and with/without PVA. Legend of horizontal axis from bottom to top: Cellulose %, Presence and type of polyvinyl alcohol (PVAf or PVAb), PVA %. The white and hatched bars do not include the thermal stabilizer and use glass or polyamide, respectively. The black and dot filled bars used glass and polyamide, respectively with Dicy as thermal stabilizer.

Figure 3:
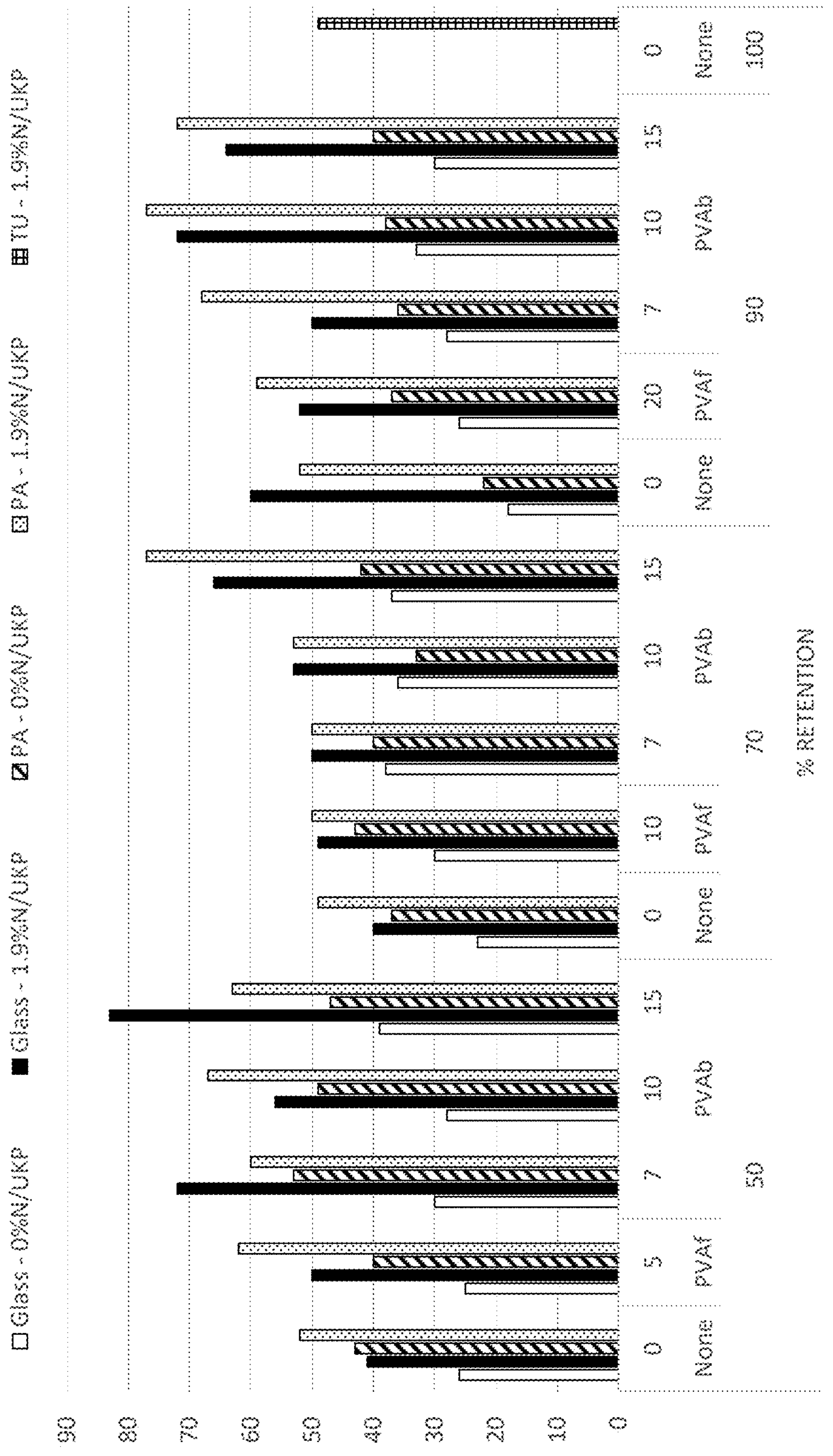
FIG. 3 is a chart of tensile index retention after ageing of examples of electrical insulation paper.

As can be seen from FIG. 3, especially the following examples had a particularly good tensile index retention (of around 70% or more):

2 comprising 50% glass fibers, 7 to 15% PVAb and 1.9% N/UKP, 1 comprising 30% PA fibers, 15% PVAb, and 1.9% N/UKP 1 comprising 10% glass fibers, 10% PVAb and 1.9% N/UKP.

2 comprising 10% PA fibers, 10 to 15% PVAb and 1.9% N/UKP.

It was further observed that there may be a synergetic effect in terms of higher tensile index retention between PVAb and Dicy combined.

Figure 4:
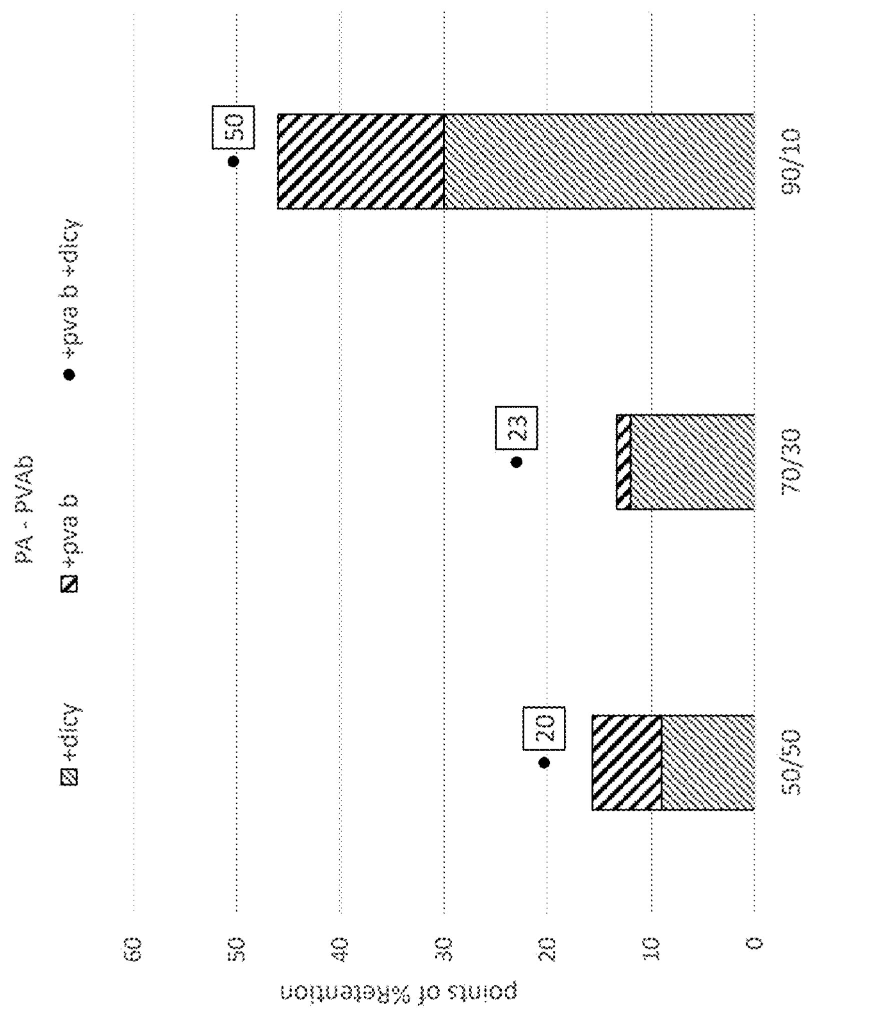
FIG. 4 is a chart of tensile index retention after ageing of examples of electrical insulation paper.

FIG. 4 shows contributions to the retention of the tensile index retention, expressed as percentages of the initial tensile index, of the PVAb alone, of the Dicy alone and of the PVAb and Dicy combined. Tensile index retention contribution of Dicy, of PVAb and of combinations of both (round marks) for PA fibers containing prototypes.

As illustrated by FIG. 4, there are synergies between the PVAb and the Dicy. Indeed, on FIG. 4, the columns represent the cumulative effect of Dicy and PVAb alone on the tensile index retention, and the points represent the tensile index retention of the blend of Dicy and PVAb. As it can be easily seen, these points are well above the columns thus showing an improvement of this tensile index retention while using a blend of these compounds.

The results show that a non-cellulosic fiber content of up to 50% for glass fibers and of up to 30% for PA fibers, and a PVAb content equal to or above 10%, optionally at least 15% based on basepaper, may particularly promote a high tensile index and good tensile index retention.

According to another example Binder 1 (PVAb) can be replaced fully or in part with poly(vinyl alcohol-co-ethylene) having a degree of hydrolysis of at least 88 mol %—i.e. only PVAmb can be used or a blend of PVAmb and PVAb can be used.

A fifth set of electrical insulation papers was manufactured from cellulose fibers and glass fibers. As cellulose fibers, UKP were used. However, the present disclosure is not limited thereto. For example, other cellulose fibers may be used. Specifically, base papers were manufactured with different cellulose and PA fibers content ratios, namely a series with 70% by weight of cellulose fibers and 30% by weight of glass fibers, and a series with 90% by weight of cellulose fibers and 10% by weight of glass fibers. These two series will in the following be referred to as example series 13 and 15. Glass fibers having a length of 3 to 32 mm and a diameter of 3 to 30 μm were used. In particular, glass fibers having a length of 3 to 20 mm and a diameter of 6 to 20 μm were used. More particularly, glass fibers having a length of 3 to 13 mm and a diameter of 8 to 15 μm were used.

A sixth set of electrical insulation papers was manufactured from cellulose fibers and polyamide (PA) fibers. As cellulose fibers, UKP were used. However, the present disclosure is not limited thereto. For example, other cellulose fibers may be used. Specifically, base papers were manufactured with different cellulose and PA fibers content ratios, namely a series with 70% by weight of cellulose fibers and 30% by weight of PA fibers, and a series with 90% by weight of cellulose fibers and 10% by weight of PA fibers. These two series will in the following be referred to as example series 14 and 16. PA fibers having a length of 2 to 12 mm and a linear density of 0.4 to 7.0 dtex were used. In particular PA fibers having a length of 3 to 8 mm and a linear density of 1.2 to 2.0 dtex were used.

Moreover, each of series 13-16 were manufactured in different variants containing a blend of polyvinyl alcohol (PVAb) and of modified polyvinyl alcohol (PVAmb). According to this specific embodiment the PVAmb binder is poly (vinyl alcohol-co-ethylene). According to these specific series, the PVAb has a degree of hydrolysis of at least 88 mol % and the PVAmb has a degree of hydrolysis of at least 88 mol %. More particularly, in these series a blend 1:1 by weight of PVAb and PVAmb has been used. It has further to be noted that all these series 13-16 comprise a thermal stabilizer comprising nitrogen, and more specifically dicyandiamide (Dicy). The Dicy was adjusted to satisfy 1.9% N weight content based on the cellulose fibers. More precisely, Series 13 and 14 have been manufactured with 15 wt % binder and Series 15 and 16 have been manufactured with 10 wt % binder.

The following Table 3 summarizes the manufacturing parameters for the different variants of the mentioned example series 13-16 that were manufactured.

TABLE 3

Example series 13-16

| | Example Series | | 13 | 14 | 15 | 16 |
|---|---|---|---|---|---|---|
| Base | Cellulose | | 70% | 70% | 90% | 90% |
| | Synthetic | Glass | 30% | | 10% | |
| | | PA | | 30% | | 10% |
| | Calendaring | | No | No | No | No |
| Lab impregnation (% of basepapers) | Blend 1:1 PVAmb:PVAb with Dicy 1.9% N based on cell. Fbrs. | Content 10 | | | 9.88% | 9.52% |
| | | Content 15 | 15.73% | 15.71% | | |

The conductivity of the different variants of the manufactured example series 13-16 was examined after manufacturing. Results are shown in FIG. 5. Conductivity of aqueous extracts measured according to IEC60554-2 of unimpregnated base paper (black), impregnated papers with 15% of a 1:1 ratio of PVAb and PVAmb (horizontal stripes) corresponding to paper series 13 and 14, impregnated papers with 15% PVAmb (hatched), impregnated papers with 10% of a 1:1 ratio of PVAb and PVAmb (grey) corresponding to paper series 15 and 16, and impregnated papers with 10% of PVAmb (white).

The tensile index of the different variants of the manufactured example series 13-16 was examined, (both initial tensile in Nm/g after manufacturing, and retention of tensile index in % after aging). Results are shown in FIGS. 6 and 7.

Figure 6:
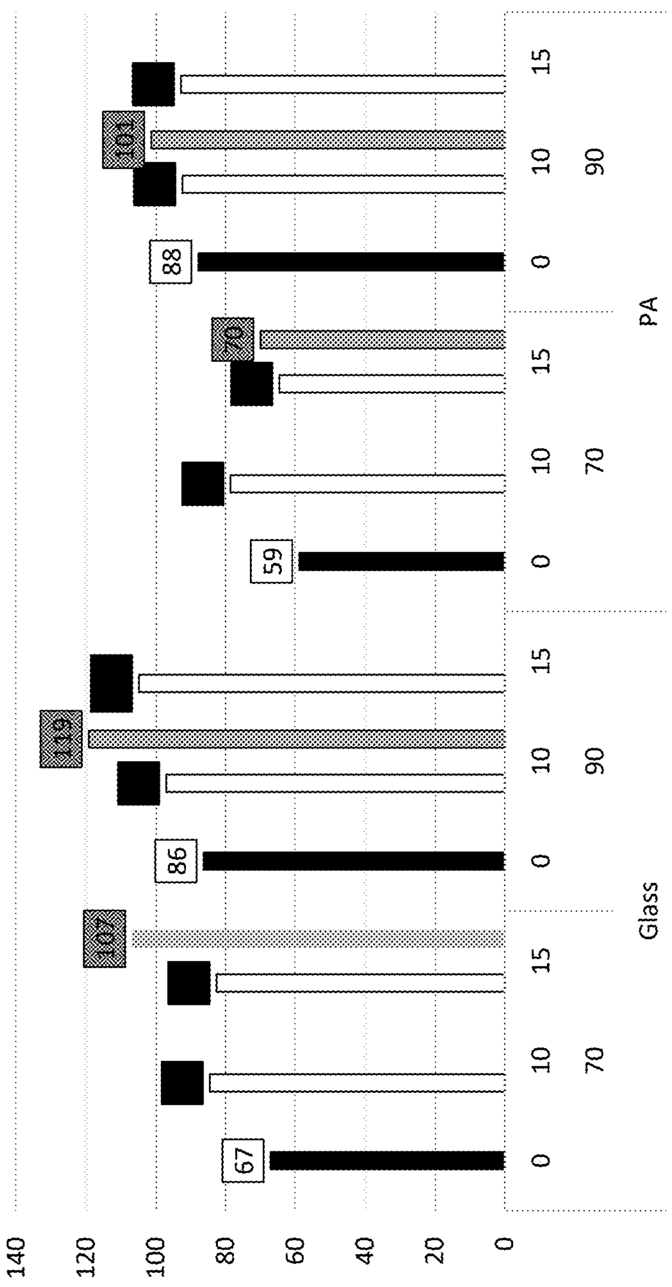
FIG. 6 is a chart of the initial tensile index of examples of electrical insulation paper.

FIG. 6 shows the nitial tensile index of the prototypes corresponding to Series 13-16 and compared to the base paper without impregnation and with the base paper impregnated with 10 or 15 wt % PVAmb. Legend of the horizontal axis from bottom to top: Cellulose %; presence of resin composition. It has to be noted that the complement to reach 100% for the fiber mix is completed by the synthetic fibers used (glass or PA), the compositions of the prototypes corresponding to the ones listed in Table 3.

Figure 7:
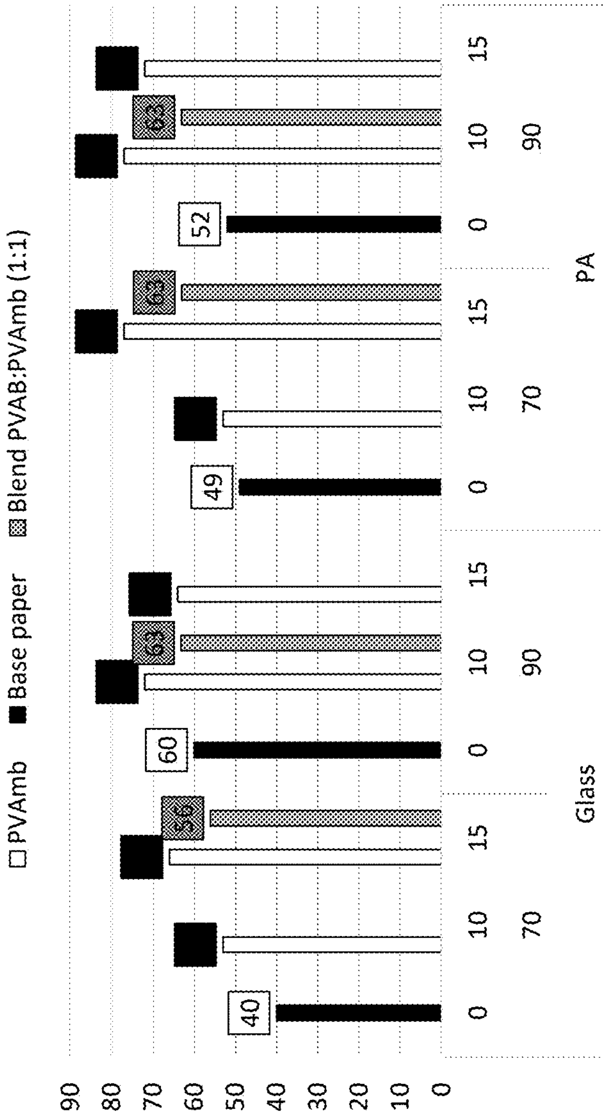
FIG. 7 is a chart of tensile index retention after ageing of examples of electrical insulation paper.

FIG. 7 shows tensile index retention in % of the prototypes corresponding to Series 13-16 compared to a base paper without impregnation with a resin or impregnated with 10 or 15 wt % of PVAmb. Legend of horizontal exis from bottom to top: Cellulose %; presence of resin composition. It has to be noted that the complement to reach 100% for the fiber mix is completed by the synthetic fibers used (glass or PA), the compositions of the prototypes corresponding to the ones listed in Table 3.

As can be seen on FIG. 5, the impregnation of the base paper with PVAmb or with the 1:1 blend of PVAb and PVAmb enables an improvement of the tensile index retention of the paper.

The following aspects form part of the present disclosure:

Aspect 1: An electrical insulation paper comprising: at least 25% content by weight of cellulose fibers based on the total weight of the electrical insulation paper; at least 5% content by weight of synthetic fibers based on the total weight of the electrical insulation paper, the synthetic fibers comprising aliphatic polyamide fibers and/or glass fibers; and a thermal stabilizer comprising nitrogen, wherein a content by weight of the nitrogen constitutes between 1% and 4% of the content by weight of the cellulose fibers.

Aspect 2. The electrical insulation paper of Aspect 1, comprising at least 50%, optionally at least 65% content by weight of cellulose fibers based on the total weight of the electrical insulation paper; and 7 to 35%, optionally 7 to 27%, or 8 to 25% content by weight of synthetic fibers based on the total weight of the electrical insulation paper, said synthetic fibers being polyamide fibers, such as aliphatic polyamide fibers, or a blend of polyamide fibers, such as aliphatic polyamide fibers, and glass fibers.

Aspect 3. The electrical insulation paper of Aspect 1, comprising: at least 45%, optionally at least 65% content by weight of cellulose fibers based on the total weight of the electrical insulation paper; and 5 to 55%, optionally 7 to 42%, or 8 to 25% content by weight of synthetic fibers based on the total weight of the electrical insulation paper, said synthetic fibers being glass fibers, or a blend of glass fibers and polyamide fibers, such as aliphatic polyamide fibers.

Aspect 4. The electrical insulation paper according to any one of the preceding Aspects, wherein the thermal stabilizer comprising nitrogen is chosen among dicyandiamide, urea, melamine, polyacrylamide, or mixture thereof.

Aspect 5. The electrical insulation paper of any one of the preceding Aspects, wherein a content by weight of the nitrogen of the thermal stabilizer constitutes between 1% and 4%, optionally 1.2% to 2.3% of the content by weight of the cellulose fibers.

Aspect 6. The electrical insulation paper of any one of the preceding Aspects, characterized in that it further comprises a binder in an amount of 5 to 20% content by weight based on the total weight of the electrical insulation paper, said binder being chosen among thermofusible fibers, resin, or mixtures thereof.

Aspect 7. The electrical insulation paper of item 6, wherein the binder is a resin, optionally comprising the thermal stabilizer comprising nitrogen.

Aspect 8. The electrical insulation paper of item 7, wherein the binder includes a polyvinyl alcohol binder, preferably having a degree of hydrolysis of at least 88 mol %.

Aspect 9. The electrical insulation paper of Aspect 8, wherein polyvinyl alcohol binder includes polyvinyl alcohol or a modified polyvinyl alcohol.

Aspect 10. The electrical insulation paper of Aspect 9, wherein the modified polyvinyl alcohol binder comprises poly (vinyl alcohol-co-ethylene).

Aspect 11. The electrical insulation paper of Aspect 10, wherein the poly (vinyl alcohol-co-ethylene) has a degree of hydrolysis of at least 88 mol %.

Aspect 12. The electrical insulation paper of Aspect 7, wherein the binder is a mixture of polyvinyl alcohol and of modified polyvinyl alcohol.

Aspect 13. The electrical insulation paper of Aspect 12, wherein the modified polyvinyl alcohol is poly (vinyl alcohol-co-ethylene).

Aspect 14. The electrical insulation paper of any one of Aspects 12 or 13, wherein the polyvinyl alcohol has a degree of hydrolysis of at least 88 mol %.

Aspect 15. The electrical insulation paper of any one of Aspects 12 to 14, wherein the modified polyvinyl alcohol has a degree of hydrolysis of at least 88 mol %.

Aspect 16. The electrical insulation paper of any one of Aspects 12 to 15, wherein the polyvinyl alcohol and the modified polyvinyl alcohol are blended in a ratio of 1:5 to 5:1 by weight, preferably in a ratio of 1:3 to 3:1 by weight, and more preferably in a 1:1 ratio by weight.

Aspect 17. The electrical insulation paper according to Aspect 6, characterized in that the binder comprises thermofusible fibers, the electrical insulation paper comprising 5 to 18%, preferably 9 to 17%, or, more preferably, 10 to 16% content by weight of thermofusible fibers based on the total weight of the electrical insulation paper.

Aspect 18. The electrical insulation paper of Aspect 17, wherein the thermofusible fibers have a length of 2 to 12 mm, optionally 3 to 8 mm, and/or a linear density of 0.4-7.0 dtex (decitex), optionally 1.2-2.0 dtex (decitex).

Aspect 19. The electrical insulation paper of any one of the preceding Aspects, wherein the cellulose fibers comprise Kraft fibers, cotton fibers, linen fibers, hemp fibers, and wherein the cellulose fibers are unbleached, bleached, and/or semi-bleached, hardwood and/or softwood fibers.

Aspect 20. The electrical insulation paper of any one of the preceding Aspects, wherein the glass fibers have a length of 3 to 32 mm, preferably of 3 to 20 mm, and more preferably of 3 to 13 mm.

Aspect 21. The electrical insulation paper of Aspect 20, wherein the glass fibers have a diameter of 3 to 30 μm, preferably of 6 to 20 μm, more preferably of 8 to 15 μm.

Aspect 22. The electrical insulation paper of any one of the preceding Aspects, wherein the polyamide fibers have a length of 2 to 12 mm, preferably of 3 to 8 mm.

Aspect 23. The electrical insulation paper of Aspect 22, wherein the polyamide fibers have a linear density of 0.4 to 7.0 dtex, preferably of 1.2 to 2.0 dtex.

Aspect 24. A method of manufacturing an electrical insulation paper, comprising the steps of: providing cellulose fibers and synthetic fibers; —manufacturing a base paper from the cellulose fibers and synthetic fibers on a paper machine, with at least 25% content by weight of the cellulose fibers based on the total weight of the electrical insulation paper, and at least 5% content by weight of the synthetic fibers based on the total weight of the electrical insulation paper; wherein the method further comprises adding a thermal stabilizer comprising nitrogen, wherein a content by weight of the nitrogen constitutes between 1% and 4% of the content by weight of the cellulose fibers.

Aspect 25. The method of Aspect 24, wherein the manufacturing comprises manufacturing a base paper from the cellulose fibers and synthetic fibers on a paper machine, with at least 50%, preferably at least 65% content by weight of the cellulose fibers based on the total weight of the electrical insulation paper, and at least 7 to 35%, preferably 7 to 27%, or more preferably 8 to 25% content by weight of the synthetic fibers based on the total weight of the electrical insulation paper, said synthetic fibers being polyamide fibers, such as aliphatic polyamide fibers, or a blend of polyamide fibers, such as aliphatic polyamide fibers, and glass fibers.

Aspect 26. The method of Aspect 24, wherein the manufacturing comprises manufacturing a base paper from the cellulose fibers and synthetic fibers on a paper machine, with at least 45%, preferably at least 65% content by weight of the cellulose fibers based on the total weight of the electrical insulation paper, and 5 to 55%, optionally 7 to 42%, or 8 to 25% content by weight of the synthetic fibers based on the total weight of the electrical insulation paper, said synthetic fibers being glass fibers, or a blend of glass fibers and polyamide fibers, such as aliphatic polyamide fibers.

Aspect 27. The method of any one of Aspects 24 to 26, wherein it further comprises a step of adding a binder in an amount of 5 to 20% by weight based on the total weight of the electrical insulation paper, said binder being chosen among thermofusible fibers, resin, or mixtures thereof.

Aspect 28. The method of Aspect 27, wherein the binder is a resin, said resin being coated on the base paper after the addition of the thermal stabilizer comprising nitrogen.

Aspect 29. The method of Aspect 27, wherein the binder is a resin, said resin being coated on the base paper just after the step of manufacturing the base paper and before the addition of the thermal stabilizer comprising nitrogen.

Aspect 30. The method of Aspect 27, wherein the binder is thermofusible fibers, said thermofusible fibers being mixed with the cellulosic and synthetic fibers before the manufacturing step of the base paper.

Aspect 31. The method of Aspect 27, wherein the binder is a resin, said resin also comprising the thermal stabilizer comprising nitrogen, said resin being coated on the base paper just after the manufacturing step of said base paper.

Aspect 32. The method of any one of Aspects 30 to 31, wherein the base paper is manufactured with a weight content of thermofusible fibers of 8 to 18%, optionally 9 to 17%, or 10 to 16%.

Aspect 33. The method of any one of Aspects 30 to 32, wherein the thermofusible fibers have a length of 2 to 12 mm, preferably 3 to 8 mm, and/or a linear density of 0.4-7.0 dtex (decitex), preferably 1.2-2.0 dtex (decitex).

Aspect 34. The method of any one of Aspects 27 to 33, wherein the electrical insulation paper is manufactured with a resin, preferably comprising the thermal stabilizer comprising nitrogen.

Aspect 35. The method of Aspect 34, the resin includes a polyvinyl alcohol binder, preferably having a degree of hydrolysis of at least 88 mol %.

Aspect 36. The method of Aspect 34, wherein the resin comprises a modified polyvinyl alcohol.

Aspect 37. The method of Aspect 36, wherein the modified polyvinyl alcohol binder comprises poly (vinyl alcohol-co-ethylene).

Aspect 38. The method of Aspect 37, wherein the poly (vinyl alcohol-co-ethylene) has a degree of hydrolysis of at least 88 mol %.

Aspect 39. The method of Aspect 34, wherein the resin comprises a mixture of polyvinyl alcohol and of modified polyvinyl alcohol.

Aspect 40. The method of Aspect 39, wherein the modified polyvinyl alcohol is poly (vinyl alcohol-co-ethylene).

Aspect 41. The method of any one of Aspect 39 or 40, wherein the polyvinyl alcohol has a degree of hydrolysis of at least 88 mol %.

Aspect 42. The method of any one of Aspects 39 to 41, wherein the modified polyvinyl alcohol has a degree of hydrolysis of at least 88 mol %.

Aspect 43. The method of any one of Aspects 39 to 42, wherein the polyvinyl alcohol and the modified polyvinyl alcohol are blended in a ratio of 1:5 to 5:1 by weight, preferably in a ratio of 1:3 to 3:1 by weight, and more preferably in a 1:1 ratio by weight.

Aspect 44. The method of any one of Aspects 24 to 43, wherein the cellulose fibers comprise Kraft fibers, cotton fibers, linen fibers, hemp fibers, and wherein the cellulose fibers are unbleached, bleached, and/or semi-bleached, hardwood and/or softwood fibers.

Aspect 45. The method of any one of Aspects 24 to 44, wherein the glass fibers have a length of 3 to 32 mm, preferably of 3 to 20 mm, and more preferably of 3 to 13 mm.

Aspect 46. The method of Aspect 45, wherein the glass fibers have a diameter of 3 to 30 μm, preferably of 6 to 20 μm, more preferably of 8 to 15 μm.

Aspect 47. The method according to any one of Aspects 24 to 46, wherein the polyamide fibers have a length of 2 to 12 mm, preferably of 3 to 8 mm.

Aspect 48. The method of Aspect 47, wherein the polyamide fibers have a linear density of 0.4 to 7.0 dtex, preferably of 1.2 to 2.0 dtex.

Aspect 49. The method of manufacturing an electrical insulation paper of any one of Aspects 30, 32, and 33, comprising a step, prior to the step of adding the thermal stabilizer comprising nitrogen or of coating the base paper with the resin, of hot calendaring the base paper at a temperature in a range of 120° C. to 160° C. and with a pressure in a range of 800 daN to 1200 daN.

Aspect 50. An electrical insulation paper comprising at least one layer manufactured in accordance with the method of any one of Aspects 24 to 49.

Aspect 51. Use of the electrical insulation paper according to any one of Aspects 1 to 23 or 50 for insulating wires of high-voltage liquid-immersed transformers or dry transformers.

Aspect 52. Use of the electrical insulation paper according to any one of Aspects 1 to 23 or 50 for insulating of wires used in traction transformers.

Aspect 53. Use of the electrical insulation paper according to any one of Aspects 1 to 23 or 50 for a low voltage foil winding in distribution transformers.

Aspect 54. A high-voltage liquid-immersed transformer comprising at least one wire that is insulated by the electrical insulation paper according to any one of Aspects 1 to 23 or 50.

Aspect 55. A dry transformer comprising at least one wire that is insulated by the electrical insulation paper according to any one of Aspects 1 to 23 or 50.

Aspect 56. A traction transformer comprising at least one wire that is insulated by the electrical insulation paper according to any one of Aspects 1 to 23 or 50.

Aspect 57. A distribution transformer with at least one low voltage foil winding comprising the electrical insulation paper according to any one of Aspects 1 to 23 or 50.

It will be apparent to those skilled in the art that various modifications and variations can be made in the disclosed devices and systems without departing from the scope of the disclosure. Other aspects of the disclosure will be apparent to those skilled in the art from consideration of the specification and practice of the features disclosed herein. It is intended that the specification and examples be considered as exemplary only. Many additional variations and modifications are possible and are understood to fall within the framework of the disclosure.

The invention claimed is:

1. An electrical insulation paper comprising:

at least 25% content by weight of cellulose fibers based on the total weight of the electrical insulation paper;

at least 5% content by weight of synthetic fibers based on the total weight of the electrical insulation paper, the synthetic fibers comprising aliphatic polyamide fibers and/or glass fibers; and a thermal stabilizer comprising nitrogen, wherein a content by weight of the nitrogen constitutes between 1% and 4% of the content by weight of the cellulose fibers.

2. The electrical insulation paper of claim 1, comprising:

at least 50% content by weight of cellulose fibers based on the total weight of the electrical insulation paper; and 7 to 35% content by weight of synthetic fibers based on the total weight of the electrical insulation paper, said synthetic fibers being polyamide fibers and glass fibers.

3. The electrical insulation paper of claim 1, comprising:

at least 45% content by weight of cellulose fibers based on the total weight of the electrical insulation paper; and 5 to 55% content by weight of synthetic fibers based on the total weight of the electrical insulation paper, said synthetic fibers being glass fibers, or a blend of glass fibers and polyamide fibers.

4. The electrical insulation paper according to claim 1, wherein the thermal stabilizer comprising nitrogen is selected from dicyandiamide, urea, melamine, polyacrylamide, or a mixture thereof.

5. The electrical insulation paper of claim 1, further comprising a binder in an amount of 5 to 20% content by weight based on the total weight of the electrical insulation paper, said binder being selected from thermofusible fibers, resin, or mixtures thereof.

6. The electrical insulation paper of claim 5, wherein the binder is a resin, and optionally the resin comprises the thermal stabilizer comprising nitrogen.

7. The electrical insulation paper of claim 6 wherein the resin comprises a polyvinyl alcohol.

8. A transformer comprising the electrical insulation paper of claim 1 wherein the transformer is selected from high voltage liquid immersed transformer, dry transformer, or traction transformer.

9. The electrical insulation paper of claim 1 wherein the thermal stabilizer consists essentially of dicyandiamide.

10. A method of manufacturing an electrical insulation paper, comprising the steps of:

providing cellulose fibers and synthetic fibers;

manufacturing a base paper from the cellulose fibers and synthetic fibers on a paper machine, with at least 25% content by weight of the cellulose fibers based on the total weight of the electrical insulation paper, and at least 5% content by weight of the synthetic fibers based on the total weight of the electrical insulation paper, the synthetic fibers comprising aliphatic polyamide fibers and/or glass fibers;

wherein the method further comprises adding a thermal stabilizer comprising nitrogen, wherein a content by weight of the nitrogen constitutes between 1% and 4% of the content by weight of the cellulose fibers.

11. The method of claim 10, further comprising adding a binder in an amount of 5 to 20% by weight based on the total weight of the electrical insulation paper, said binder being selected from thermofusible fibers, resin, or mixtures thereof.

12. The method of claim 11, wherein the binder is a resin, said resin being coated on the base paper after the addition of the thermal stabilizer comprising nitrogen.

13. The method of claim 11, wherein the binder is a resin, said resin being coated on the base paper just after the step of manufacturing the base paper and before the addition of the thermal stabilizer comprising nitrogen.

14. The method of claim 11, wherein the binder is thermofusible fibers, said thermofusible fibers being mixed with the cellulosic and synthetic fibers before the manufacturing step of the base paper.

15. The method of claim 11, wherein the binder is a resin, said resin also comprising the thermal stabilizer comprising nitrogen, said resin being coated on the base paper just after the manufacturing step of said base paper.

16. The method of manufacturing an electrical insulation paper of claim 14, comprising a step, prior to the step of adding the thermal stabilizer comprising nitrogen or of coating the base paper with the resin, of hot calendaring the base paper at a temperature in a range of 120° C. to 160° C. and with a pressure in a range of 800 daN to 1200 daN.

* * * * *